(12) United States Patent
Kocks et al.

(10) Patent No.: US 8,601,076 B2
(45) Date of Patent: Dec. 3, 2013

(54) SYSTEMS AND METHODS FOR IDENTIFYING AND NOTIFYING USERS OF ELECTRONIC CONTENT BASED ON BIOMETRIC RECOGNITION

(75) Inventors: Peter F. Kocks, San Francisco, CA (US); Guoning Hu, Fremont, CA (US); Abhinav Sarje, San Francisco, CA (US)

(73) Assignee: AOL Inc., Dulles, VA (US)

( * ) Notice: Subject to any disclaimer, the term of this patent is extended or adjusted under 35 U.S.C. 154(b) by 229 days.

(21) Appl. No.: 13/156,747

(22) Filed: Jun. 9, 2011

(65) Prior Publication Data

US 2012/0011085 A1    Jan. 12, 2012

Related U.S. Application Data

(60) Provisional application No. 61/353,524, filed on Jun. 10, 2010.

(51) Int. Cl.
*G06F 15/16* (2006.01)

(52) U.S. Cl.
USPC ............ 709/206; 709/202; 713/186; 382/118

(58) Field of Classification Search
USPC .......... 709/202–203, 206–207; 713/182, 186; 382/115, 118
See application file for complete search history.

(56) References Cited

U.S. PATENT DOCUMENTS

| | | | |
|---|---|---|---|
| 6,317,834 B1 * | 11/2001 | Gennaro et al. | 713/186 |
| 6,580,814 B1 * | 6/2003 | Ittycheriah et al. | 382/115 |
| 6,957,337 B1 * | 10/2005 | Chainer et al. | 713/186 |
| 2003/0182118 A1 | 9/2003 | Obrador et al. | |
| 2008/0209229 A1 * | 8/2008 | Ramakrishnan et al. | 713/186 |
| 2011/0116690 A1 * | 5/2011 | Ross et al. | 382/118 |

FOREIGN PATENT DOCUMENTS

| | | |
|---|---|---|
| EP | 1 043 665 | 10/2000 |
| EP | 2 395 502 | 12/2011 |
| EP | 2 400 404 | 12/2011 |
| WO | WO 03/041410 | 5/2003 |
| WO | WO 03/046761 | 6/2003 |

OTHER PUBLICATIONS

European Search Report, dated Nov. 24, 2011,issued for EP 11004780.0-2201, 9 pgs.
European Search Report, dated Sep. 23, 2011, issued for EP 11004781.8-1224, 7 pgs.
Sargin, Mehmet Emre et al., "Audiovisual celebrity recognition in unconstrained web videos", ICASSP 2009, pp. 1977-1980.

(Continued)

*Primary Examiner* — Bharat N Barot
(74) *Attorney, Agent, or Firm* — Finnegan, Henderson, Farabow, Garrett & Dunner, LLP

(57) ABSTRACT

Systems and methods are disclosed for manipulating electronic multimedia content to a user. One method includes generating a plurality of biometric models, each biometric model corresponding to one of a plurality of people; receiving electronic media content over a network; extracting image or audio data from the electronic media content; detecting biometric information in the image or audio data; and calculating a probability of the electronic media content involving one of the plurality of people, based on the biometric information and the plurality of biometric models.

16 Claims, 10 Drawing Sheets

(56) References Cited

OTHER PUBLICATIONS

Patel, Nilesh V. et al., "Video Classification Using Speaker Identification", Storage and Retrieval for Image and Video Databases 5, vol. 3022, Feb. 13, 1997, pp. 218-225.

Ramírez, Javier, "Statistical Voice Activity Detection Using a Multiple Observation Likelihood Ratio Test", IEEE Signal Processing Letters, vol. 12, No. 10, Oct. 2005, pp. 689-692.

Bimbot, Frédéric et al., "A Tutorial on Text-Independent Speaker Verification", EURASIP Journal on Applied Signal Processing, vol. 2004, No. 4, pp. 430-451.

* cited by examiner

FIG. 9

SYSTEMS AND METHODS FOR IDENTIFYING AND NOTIFYING USERS OF ELECTRONIC CONTENT BASED ON BIOMETRIC RECOGNITION

RELATED APPLICATION(S)

This application claims the benefit of priority of U.S. Provisional Patent Application No. 61/353,524, filed on Jun. 10, 2010. The disclosure of the above-referenced application is expressly incorporated herein in its entirety by reference.

BACKGROUND

1. Technical Field

The present disclosure relates to the manipulation and playback of electronic media content on the Internet. More particularly and without limitation, the present disclosure relates to systems and methods for identifying and notifying users about electronic media content, based on biometric recognition.

2. Background Information

On the Internet, people usually discover and view multimedia and other electronic media content in one or more fundamentally different ways: keyword searching, browsing collections, selecting related content, and/or link sharing. One common way to browse a video collection is to display a list of images that the user can browse and click to watch the videos. A user interface may be provided to allow the user to narrow the displayed list by one or more criteria, such as by category, television show, tag, date produced, source, or popularity. User interfaces may also provide the ability for users to search for videos, or other electronic media.

The performance of video search engines can be evaluated by examining the fraction of videos retrieved that are relevant to a user query and the fraction of retrieved videos that are relevant to the user's need. The traditional way for enabling searching for video content is based on metadata for a video, such as title, description, tags, etc. There are two drawbacks with this approach. First, the metadata is usually quite limited and it only provides a very brief summary of a video. In addition, the metadata of a video may not be reliable or complete, especially for those videos from a user-generated video site, such as YouTube. For example, many videos from YouTube are in fact spam videos having metadata that has nothing to do with the content of the video.

Speech-to-text techniques may also be used to augment the metadata of a video and improve recall from a collection videos. Also, a popularity and/or collaborative filter may be used to improve precision. In addition, visual analysis to identify people or objects contained within a video can be used in some cases for both improved recall and precision. However, these techniques also have drawbacks. For example, analyzing the visual content of a video to identify people and objects is computationally resource intensive and often inaccurate. Also, using only visual analysis to identify people in a video can lead to unreliable or incomplete results because the video may contain still or moving images of a person with a voice over by a narrator.

Some video search services offer update/notification services to users, whereby users may enter requests, such as special queries, and receive notifications when new videos are posted in relation to those keywords. Such a service actively tracks new videos available online and selects videos based on a user's queries. It then sends a user notification about these new videos at user-specified times. However, such a service is substantially limited by its abilities to retrieve desired videos for a user based on the effectiveness of metadata, as described above. For example, if a new video is not properly tagged in relation to a person appearing and/or speaking in the video, then users may not receive the appropriate update. Biometric analysis of videos, including the identification of people based on biological features, provides accurate ways to identify video content. However, it has traditionally been too resource-intensive for use in characterizing large amounts of electronic media on the Internet.

As a result, users of the Internet may not timely discover and view the quantity or type of online content that they desire. Insufficient content can lead users to travel away from the content sites, which may result in an attendant decrease in website use and/or advertising revenue. As a corollary, the successful display and notification of electronic media content can be useful in attracting and retaining Internet users, thereby increasing use of a website and/or online advertising revenue.

As a result, there is a need for improved systems and methods for manipulating electronic media content. Moreover, there is a need for systems and methods for identifying and notifying users about electronic media content based on effective and efficient biometric recognition.

SUMMARY

In accordance with one exemplary embodiment, a computer-implemented method is disclosed for displaying electronic multimedia content to a user. The method includes generating a plurality of biometric models, each biometric model corresponding to one of a plurality of people; receiving electronic media content over a network; and extracting image and audio data from the electronic media content. The method further includes detecting biometric information in the image and audio data; and calculating a probability of the electronic media content involving one of the plurality of people, based on the biometric information and the plurality of biometric models.

In accordance with one exemplary embodiment, a computer-implemented method is disclosed for displaying electronic multimedia content to a user. The method includes generating a plurality of biometric models, each biometric model corresponding to one of a plurality of people; receiving electronic media content over a network; extracting image or audio data from the electronic media content; and detecting biometric information in the image or audio data. The method further includes calculating a probability of the electronic media content involving one of the plurality of people, based on the biometric information and the plurality of biometric models, and receiving a search query including a person-specific modifier. The method further includes applying the probability to a ranking or filtration of electronic media content; and displaying electronic media content to users based on the person-specific modifier.

In accordance with one exemplary embodiment, a system is disclosed for displaying electronic multimedia content to a user. The system includes a database storing instructions for displaying electronic multimedia content to a user; and a processor configured to execute the instructions. The processor is configured to execute the instructions for generating a plurality of biometric models, each biometric model corresponding to one of a plurality of people; receiving electronic media content over a network; and extracting image and audio data from the electronic media content. The processor is further configured to execute the instructions for detecting biometric information in the image and audio data; and calculating a probability of the electronic media content involving one of the plurality of people, based on the biometric information and the plurality of biometric models.

In accordance with one exemplary embodiment, a non-transitory computer-readable medium storing instructions is disclosed for performing a method of displaying electronic multimedia content to a user. The method includes generating a plurality of biometric models, each biometric model corresponding to one of a plurality of people; receiving electronic media content over a network; extracting image or audio data from the electronic media content; and detecting biometric information in the image or audio data. The method further includes calculating a probability of the electronic media content involving one of the plurality of people, based on the biometric information and the plurality of biometric models; receiving a search query including a person-specific modifier; applying the probability to a ranking or filtration of electronic media content; and displaying electronic media content to users based on the person-specific modifier.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

The accompanying drawings, which are incorporated in and constitute a part of this specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF DRAWINGS

The following figures are used to describe exemplary features and embodiments related to the present disclosure. In the figures:

FIG. 9 is a screenshot of exemplary video search results, speaker "following" element and notification element of a system for manipulating electronic media content over the Internet, consistent with embodiments of the present disclosure.

Like reference symbols in the various drawings indicate like elements. For brevity, several elements in the figures described below are represented as monolithic entities. However, as would be understood by one skilled in the art, these elements each may include numerous interconnected computers and components designed to perform a set of specified operations and/or dedicated to a particular geographic region.

Additional objects and advantages will be set forth in part in the description which follows, and in part will be obvious from the description, or may be learned by practice of the embodiments of the invention. For example, the objects and advantages may be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Embodiments of the present disclosure relate to the manipulation and playback of electronic media content over the Internet. More specifically, embodiments of the present disclosure relate to techniques for identifying a person's likeness, image, voice, etc. within a video stream, to improve the rank-ordering of results of a search algorithm used to find a person within a collection of videos. In addition, these techniques are used to accurately detect videos a user would like to consume based on his/her request, for example, videos containing a given individual's likeness, image, or voice, and notify him/her about the detected videos. Furthermore, although described herein primarily in relation to video content, the disclosed embodiments may be applicable to essentially any type of electronic media content, including web-sites, audio clips, streaming media, full-length television episodes, movies, live broadcasts, songs, presentations, etc.

Figure 1:
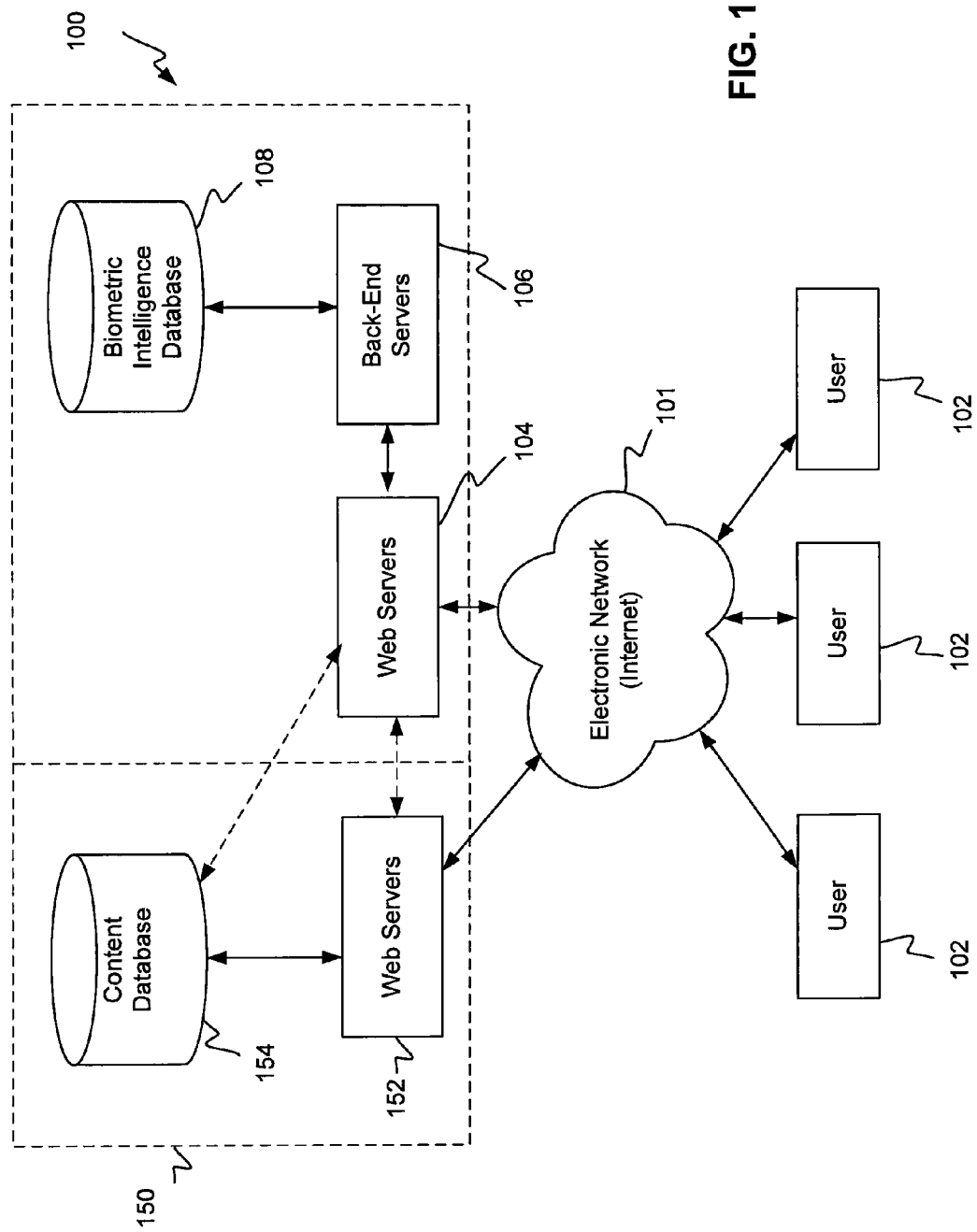
FIG. 1 depicts an exemplary system for manipulating electronic media content over the Internet, consistent with embodiments of the present disclosure.

FIG. 1 depicts an exemplary embodiment of a system 100 for manipulating electronic media content, within which embodiments of the present disclosure may be practiced. As shown in FIG. 1, a plurality of users 102 may be connected to an electronic network 101 and configured to communicate with one or more servers of system 100. Users 102 may be people who are using any type or combination of personal computers, laptops, components of a computer, set top boxes, $3^{rd}$ party portals, DVD players, digital video recorder (DVR) platforms, mobile phones or devices, PDAs, etc., or any other device configured to display multimedia content. Although the embodiment of FIG. 1 depicts limited numbers of clients and servers, it will be appreciated that exemplary system 100 may include any number of clients and servers without departing from the spirit or scope of the present disclosure.

Electronic network 101 may represent any combination of networks for providing digital data communication. Electronic network 101 may include, for example, a local area network ("LAN"), intranet, and/or a wide area network ("WAN"), e.g., the Internet. In the embodiments described herein, electronic network 101 may include any publicly-accessible network or networks and support numerous communication protocols, including, but not limited to, hypertext transfer protocol (HTTP) and transmission control protocol (TCP/IP).

In general, system 100 may include web servers 104, back-end servers 106, and optionally a biometric intelligence database 108. System 100 may also include or be disposed in communication with one or more content providers 150. Each content provider 150 may be operated by a third party and/or by the operator of system 100. Content provider 150 may include web servers 152 and a content database 154. Electronic network 101 may be connected to one or more of servers 104, 106, 152 such that clients 102 may be disposed in communication with the servers. It will be appreciated that each of servers 104, 106, 152 may include any number or combination of computers, servers, or clustered computing machines, and that databases 108, 154 may each include any number or combination of databases, which may be arranged in a "distributed computing" environment, including large-scale storage (LSS) components and/or distributed caching (DC) components. The servers and databases may be independent devices or may be incorporated into a single unit of hardware, e.g., a single computer system or single server system. In one embodiment, web servers may include a software application, such as a web service, executing on a computer.

In one embodiment, biometric intelligence database 108 may be configured to store a large volume (millions or more) of pieces of data regarding video information, speech information, image information, biometric information, speaker/speech models, user preferences, user web history, content click data, user browser information, etc. For example, biometric intelligence database 108 may be configured to store and index biometric information, videos based on the biometric characteristics detected therein, and videos based on the persons matched with the biometric characteristics. Meanwhile, content database 154 may be configured to store a large volume of different content items, such as videos, images, etc. Content database 154 may be operated by one or more third-party content providers 150, or by the operator of web servers 104 and back-end servers 106. Alternatively, the operator of web servers 104 and back-end servers 106 may maintain its own database of content items. Thus, any combination or configuration of web servers 104, back-end servers 106, biometric intelligence database 108, web servers 152, and content database 154 may be configured to perform the exemplary methods of FIGS. 2-3, and to generate and display the interfaces exemplified by the screenshots of FIGS. 4-9, as will be described in more detail below.

Figure 2:
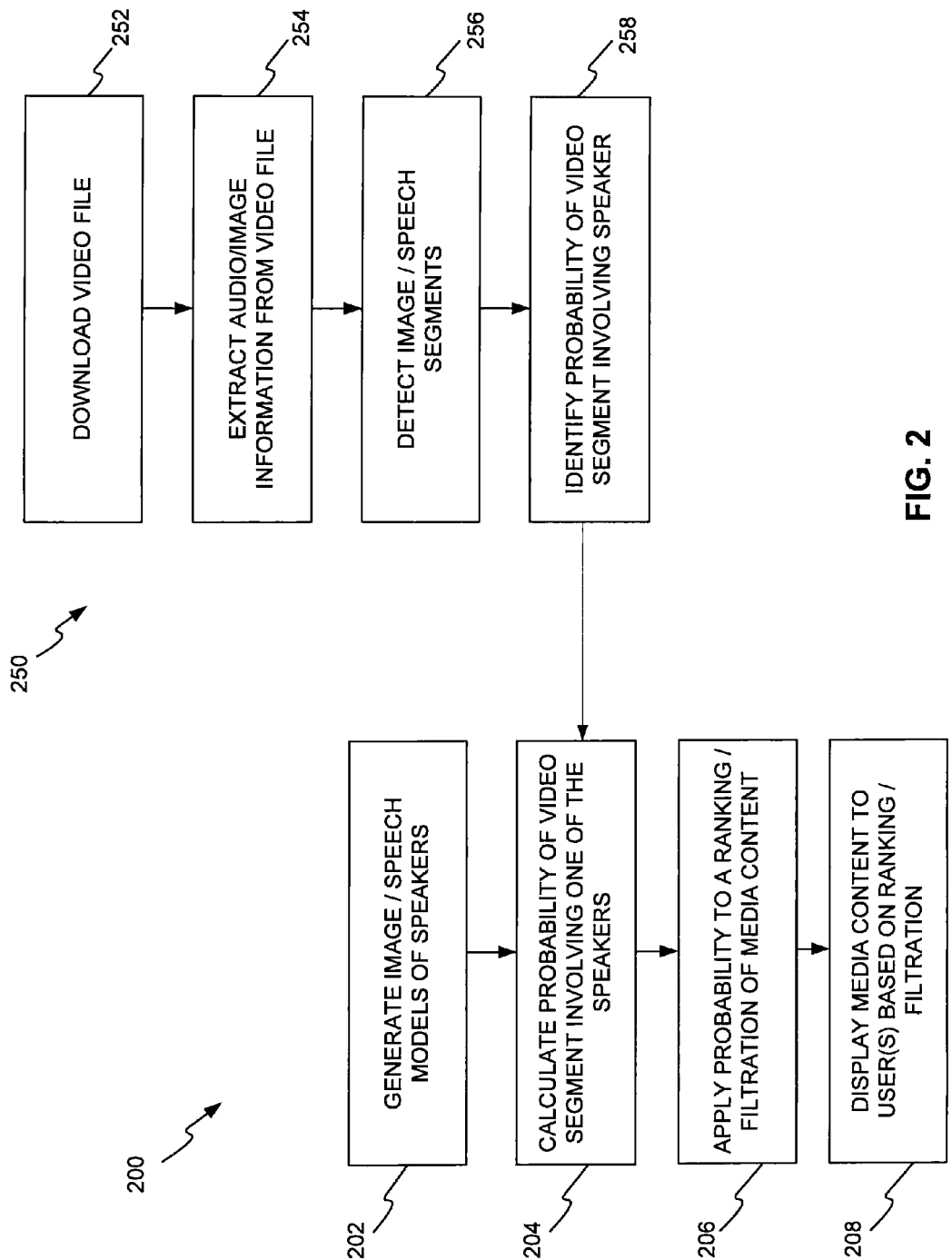
FIG. 2 depicts an exemplary method for manipulating electronic media content over the Internet, consistent with embodiments of the present disclosure.

FIG. 2 depicts an exemplary method 200 for manipulating electronic media content. In general, method 200 may include generating image and/or speech models of speakers (step 202). These models may also generally be referred to herein as "biometric models." For example, method 200 may include generating a so-called "fingerprint" of the image, likeness, voice, or speech of any speakers. By way of example, retina analysis, facial recognition, voice recognition, etc. are all biometric analysis techniques applicable to identifying people in videos. Image, speech, or other biometric models may define profiles of people who may be found in videos, with a profile being created for each person. In certain embodiments, speakers of particular interest to users 102, and therefore the operator of system 100, include celebrities, politicians, athletes, and other "famous" people. Nevertheless, embodiments of the systems and methods described herein are applicable to the recognition of any individual based on biometric characteristics. Method 200 may further include calculating a probability of a video segment involving one of the speakers (step 204), based on biometric information. For example, method 200 may analyze the similarity of a person found in a video to one or more biometric models of known people, and thereby determine the probability that the person in the video is the person for whom a model was created. Information about video segments, biometric information, and probabilities of video segments including people based on biometric information may be stored in biometric intelligence database 108. Method 200 may further include applying the calculated probability to a ranking and/or filtration of electronic media content (step 206). Method 200 may also include displaying or otherwise presenting electronic media content to users based on the ranking and/or filtration (step 208). Thus, method 200 may facilitate the presentation or playback of electronic media content to users of the Internet based on the recognition of certain speakers within videos available on the Internet.

As shown in FIG. 2, the step of calculating a probability of a video segment involving one of the speakers may be described in more detail in relation to exemplary method 250. Method 250 may include downloading a video file from a content provider of the Internet (step 252). For example, a video may be downloaded to a specific location (a disk, database or other filer), using any suitable type of protocol, such as http, mms, rtsp, rtmp, rm, etc. Method 250 may also include extracting audio and/or image data from the video file (step 254). For example, the sound track of a video may be extracted, optionally re-sampled to 22050 Hz, and normalized to 70 dB, if desired. Alternatively, or additionally, image frames may be separated out from the video. Method 250 may further include detecting image and/or speech segments based on the models generated in step 202, to break the images into frames in which people appear and the audio track into segments in which people are speaking (step 256). Method 250 may further include identifying the probability of the video segment involving the speaker based on image and/or speech models (step 258), using any known biometric identification methods. The image and/or speech models may be generated in step 202 or provided from another source. Methods 200 and/or 250 may be performed by any combination of web server systems 104 and back-end server systems 106.

Figure 3A:
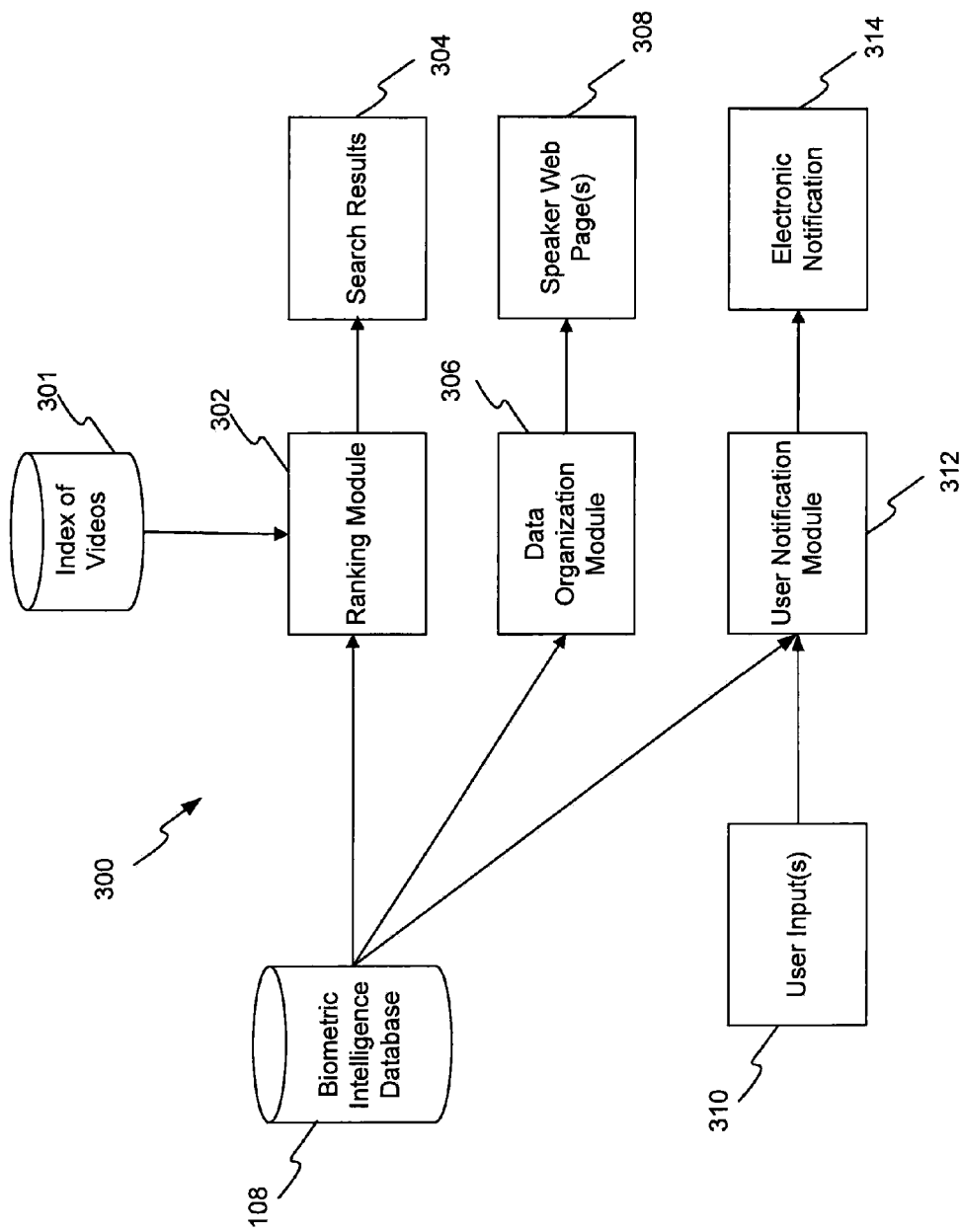
FIG. 3A depicts a flowchart of an exemplary architecture for identifying and notifying users about electronic media content over the Internet, based on biometric recognition, consistent with embodiments of the present disclosure.

FIG. 3A depicts another exemplary architecture 300 for ranking, organizing, and notifying users about electronic media content based on biometric data. As described above, information about video segments, biometric information, and probabilities of video segments including people based on biometric information may be stored in biometric intelligence database 108. In one embodiment, a ranking process 302 may be used to sequence videos based on probabilities of video segments including people based on biometric information. Thus, when a user enters the name of a person in a search query of a video search module, ranking module 302 may query biometric intelligence database 108 and/or video index 301 for videos likely to include that person, and generate search results 304. Search results 304 may be displayed on a web page, mobile device portal, television programming guide, etc. Ranking module 302 may also be thought of as a filtration process, in the event that a lower threshold is applied to the probability that a video contains the person, based on biometric information. For example, the ranking process may filter out any videos that do not have at least a predetermined threshold probability of biometric matches between people in the video and the person searched for by the user.

Architecture 300 may also include a data organization module 306, which is configured to organize data independent of user searches. For instance, architecture 300 may be configured to continuously or periodically query biometric intelligence database 108 for videos having certain biometric characteristics. Architecture 300 may organize videos based on people that appear and/or speak in the videos, based on biometric information detected in the videos. Organized data may be represented in one or more speaker web pages 308, each of which is dedicated to a particular person, and contains links, previews, and/or clips for videos containing biometric information matching that person.

In addition, architecture 300 may also include a user notification module 312, which is configured to notify users about videos based on the people that appear and/or speak in videos. For example, users may provide inputs 310 regarding the people that they are interested in. Architecture 300 may then continuously or periodically query biometric intelligence database 108 for videos having certain biometric characteristics matching the people that users are interested in. In one embodiment, architecture 300 may be configured to analyze new videos as soon as they are available so that the interested users may be notified about the videos if they are relevant to people of interest. Thus, architecture 300 may generate electronic notifications 314, which can be sent to users to inform them about new videos containing biometric information matching people of interest. Electronic notifications 314 may include links, previews, or clips of videos sent to users by email, text message, IM, electronic message, etc., as will be illustrated in more detail below.

Figure 3B:
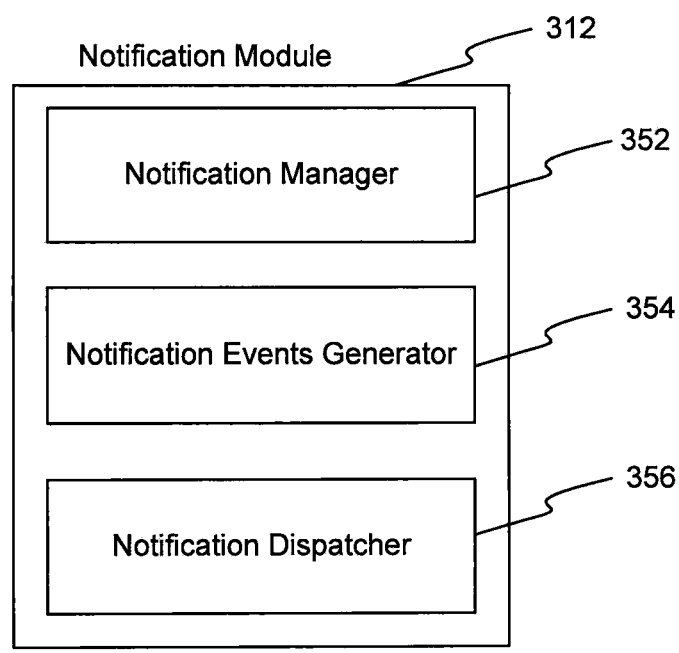
FIG. 3B depicts an exemplary architecture of a notification module for analyzing data of new videos and constructing notifications to be sent to users based on their input.

FIG. 3B depicts the architecture of an exemplary user notification module 312, including a notification manager 352, notification events generator 354, and notification dispatcher 356.

Notification manager 352 may manage all of the user subscriptions (adding, deleting, and updating subscriptions, their frequency, and type) and schedule subscriptions for dispatching any available notifications. Notification manager 352 may also maintain a database (e.g., of user subscription data) for managing all of the user subscriptions, and storing configurations corresponding to each subscription, such as the frequency of notifications, and the type of notification (e.g., e-mail). The current list of available subscriptions may include TV shows and celebrity videos, but can be easily extended to other types of videos. Notification manager 352 may also provide a user interface to allow users to easily manage their subscriptions and notification configurations. Notification manager 352 may also manage scheduling data for the active user subscriptions according to their configurations in the database, which is used by the notification dispatcher.

Notification events generator 354 may scan all new videos in the index for any notification content for every active subscription, and generate corresponding notification events. For example, notification events generator 354 may continuously scan through the index of new videos found on the Internet and generate the corresponding notification events according to the user subscriptions. In one embodiment, notification events generator 354 may check for new videos imported or updated in the video index every 5 minutes. For each active subscription item (currently TV show and celebrity videos), this process may generate events that comprise a set of new videos found for the corresponding subscription item, and populate those events into a notification database. One objective of this process is the ability to process a large amount of new incoming video data and a large number of subscriptions in real time. To address this objective, notification events generator 354 may generate notification events in a massively parallel manner over a Hadoop cluster, by utilizing the independence between each video analysis and event generation, making the process highly scalable.

Notification dispatcher 356 may pick up notification events for active subscriptions according to their frequency, construct the notifications, and delivers notifications to users in their preferred manner. Notification dispatcher 356 obtains subscription information, such as notification frequency (e.g., real-time, daily, or weekly) and type, from the database for each valid user subscription. In one embodiment, notification dispatcher 356 may implement e-mail and Facebook counters as notification types, or any other messaging types, such as text message, instant message, web-feeds, etc. After obtaining a queue of the subscriptions for which notifications can be sent right away, notification dispatcher 356 may look up the notification database for any available notification events for these subscriptions. Once notification data is obtained, notification dispatcher 356 may organize the data in a proper format, and send out the notifications to the corresponding users accordingly.

Figure 4:
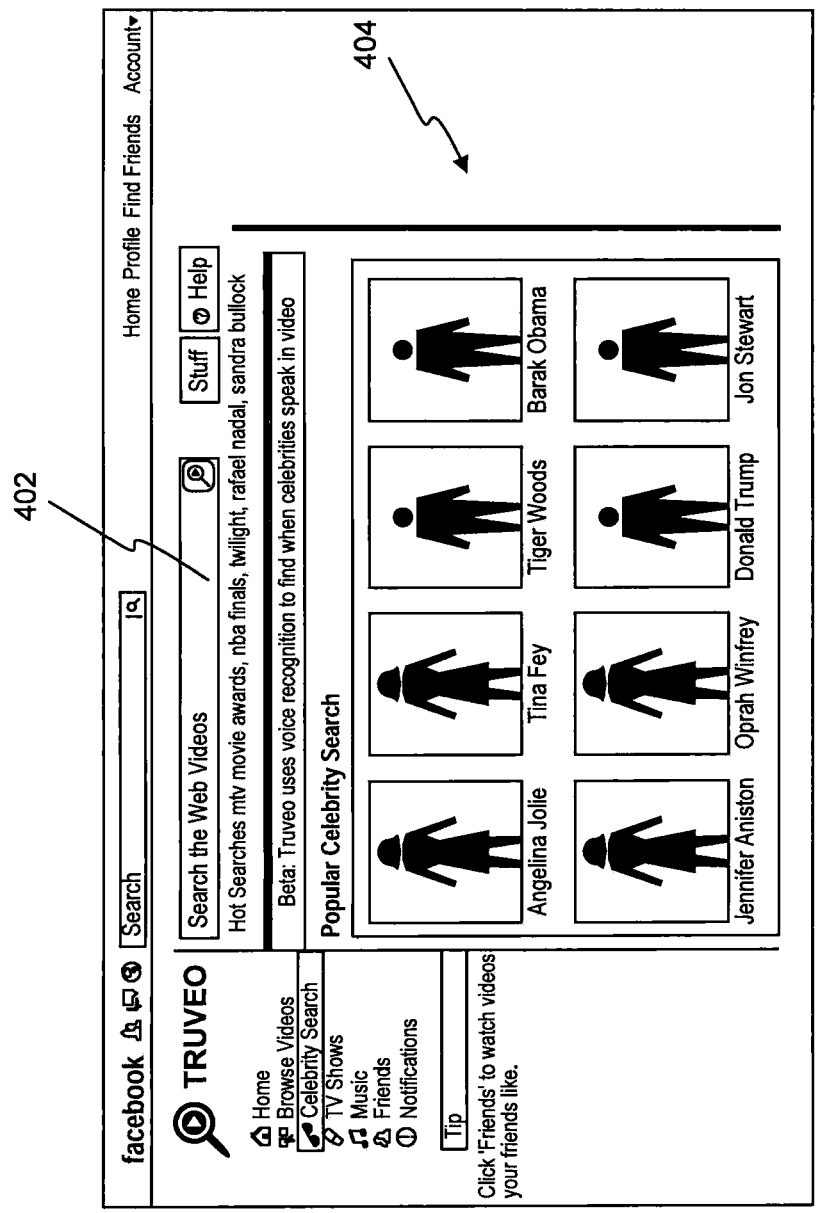
FIG. 4 is a screenshot of an exemplary search box and speaker grid of a system for manipulating electronic media content over the Internet, consistent with embodiments of the present disclosure.

FIG. 4 is a screenshot of an exemplary search box and speaker grid on a website of a system for manipulating electronic media content based on recognized speech. In particular, FIG. 4 depicts a screenshot of an exemplary video search module incorporated into a social networking web site. The video search module may include a search box 402, into which a user may type the names of celebrities or other speakers the user desires to view in a video. The video search module may also contain a celebrity/speaker grid 404, to exemplify the speakers for whom speech models have been created. Users may click on one of the celebrities/speakers in the grid 404 or search for additional individuals using search box 402. Thus, when a users selects a speaker icon or searches for a speaker, the system may search biometric intelligence database 108 for videos identified as having biometric data of that speaker. Of course, biometric intelligence database 108 may comprise tables, indices, etc. for searching by speaker, and may be combined with any desired type of access protection or back-up mechanisms. In one embodiment, the video search module and/or social networking sites may be operated on web servers 104, while speech recognition and video analysis methods may be operated on back-end servers 106.

Figure 5:
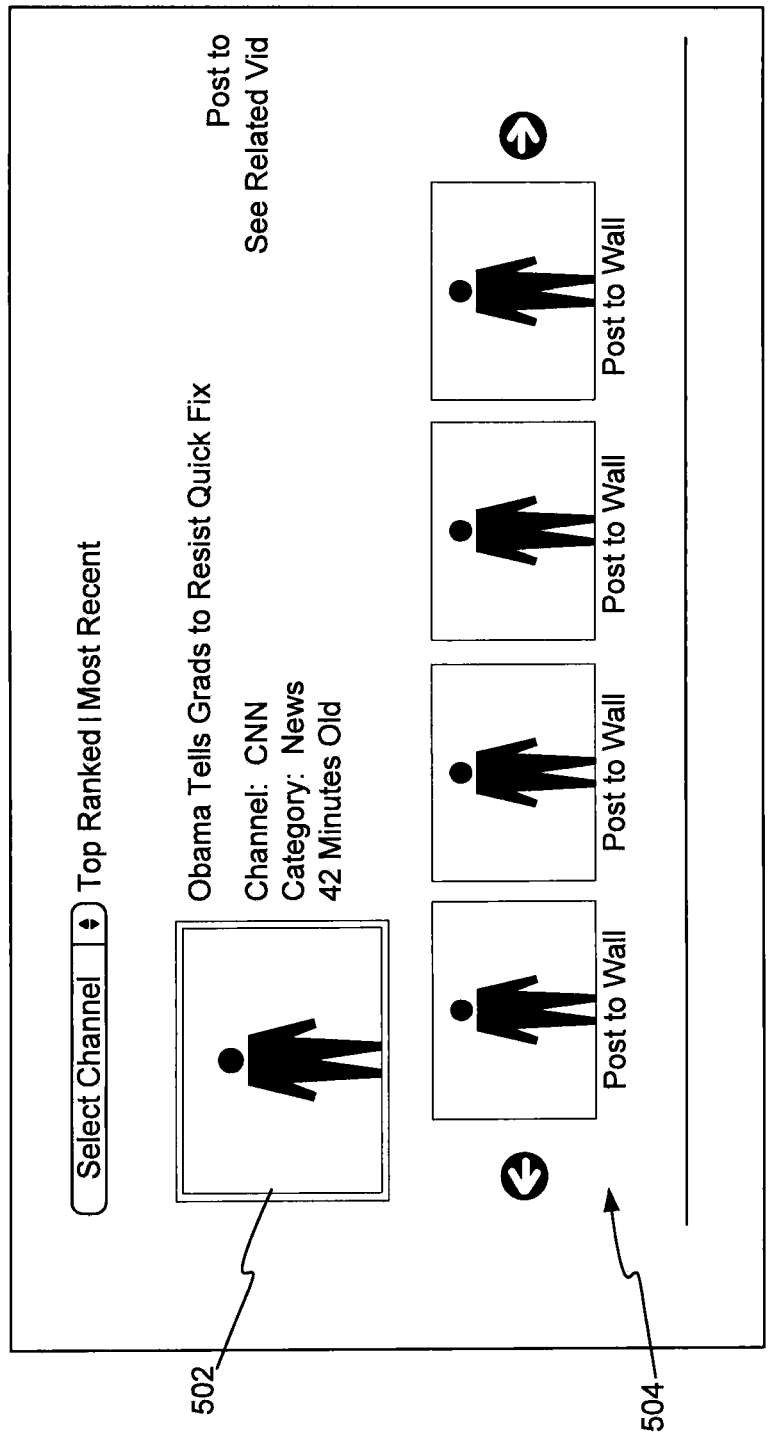
FIG. 5 is a screenshot of an exemplary search result and corresponding video clips of a system for manipulating electronic media content over the Internet, consistent with embodiments of the present disclosure.

FIG. 5 is a screenshot of an exemplary search results page and corresponding video clips associated with a video search module. In particular, assuming a user has clicked on the "Barack Obama" icon in the celebrity/speaker grid 404, the search results page may display a primary video clip 502, as well as a plurality of shorter, component video clips 504. For example, in one embodiment, methods 200 and 300 may be used to identify a video clip that has the longest section of speech by the speaker, in this case Barack Obama. That video clip may be displayed as the primary video clip 502. The component video clips 504 may be shorter 8-20 second clips that users can "mouse over" to watch short preview of parts of the primary video clip 502. If users click on the primary video clip 502 or component video clips 504, they may be redirected to the web site on which the video(s) is stored (e.g., to access content database 154 via web servers 152). In one embodiment, primary video clip 502 may be assembled from component video clips obtained from disparate sources, such as multiple content providers 150.

Figure 6:
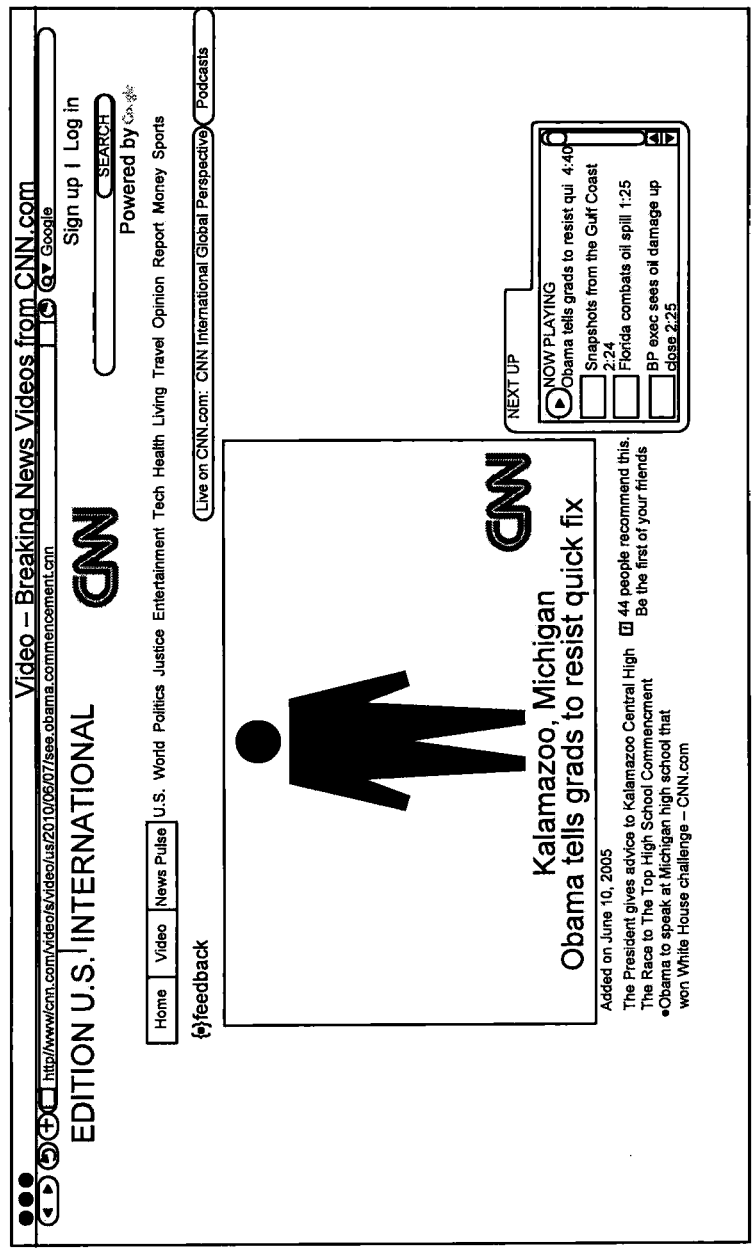
FIG. 6 is a screenshot of an exemplary web page on which a video may be available, consistent with embodiments of the present disclosure.

FIG. 6 is a screenshot of an exemplary web page on which a video may be available. In particular, once a user clicks on the primary video clip 502 or one of the component video clips 504, the user may be directed to the web site on which the complete video was originally posted, in this case "cnn.com." As a result, the operator of system 100 and methods 200, 300 may direct users to view the full video on web sites owned by entities that hold rights in the video content, while showing only fair use portions of videos through the video search module.

Figure 7A:
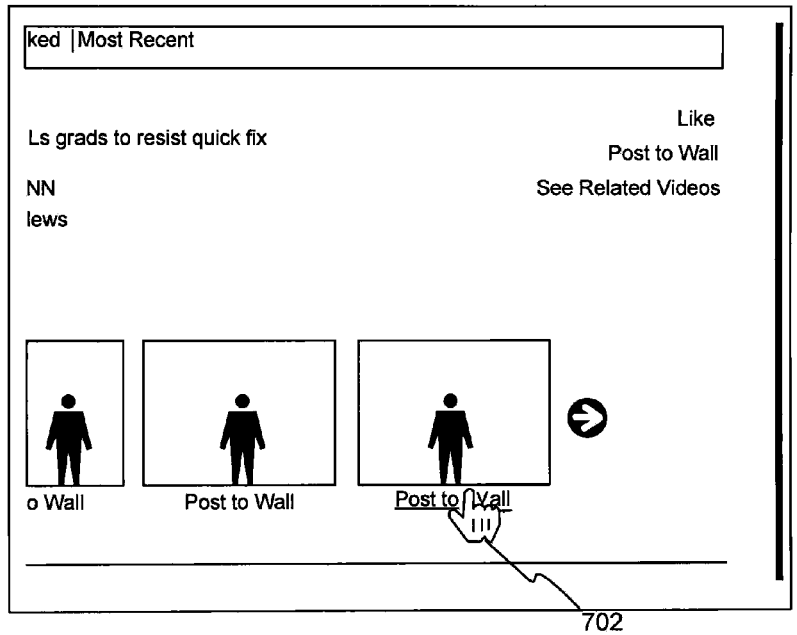
FIG. 7A is a screenshot of an exemplary video search result and user "wall post" element of a system for manipulating electronic media content over the Internet, consistent with embodiments of the present disclosure.
Figure 7B:
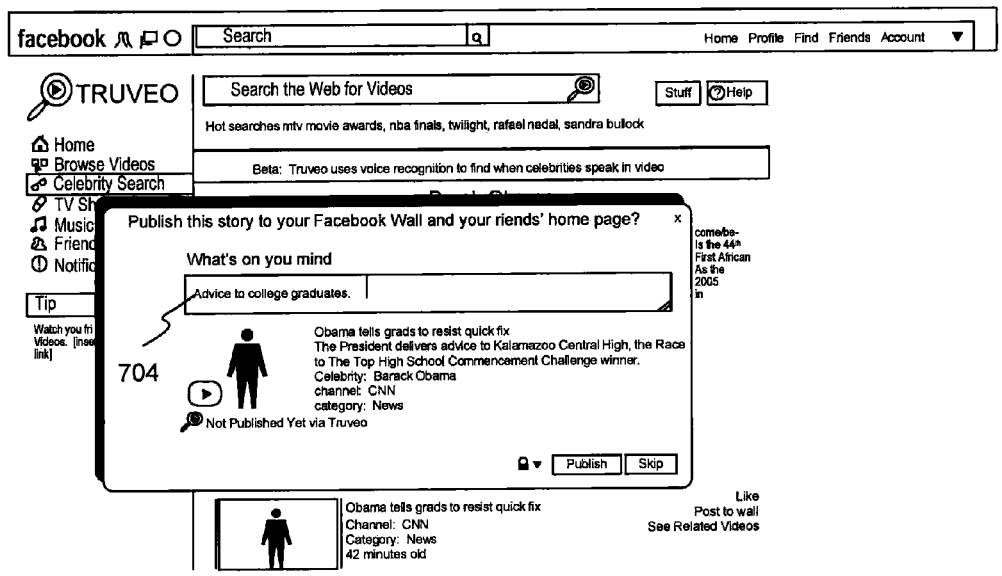
FIG. 7B is a screenshot of an exemplary user "wall post" and commentary window of a system for manipulating electronic media content over the Internet, consistent with embodiments of the present disclosure.

FIG. 7A is a screenshot of an exemplary video search results page and user "wall post" element 702, by which a user may share a favorite part of a video with the user's social contacts. For example, when using a video searching module incorporated in a social-networking site, the user may click a link entitled, e.g., "Post to Wall" to share the video with the user's social-networking friends. FIG. 7B is a screenshot of an exemplary user "wall post" and commentary window 704, by which a user may add textual commentary (e.g., "Advice to college graduates") to the posted video clip before it is posted to the user's social-networking wall. It will be appreciated that the user may incorporate any type or combination of commentary, including video commentary, video editing, etc.

Figure 8A:
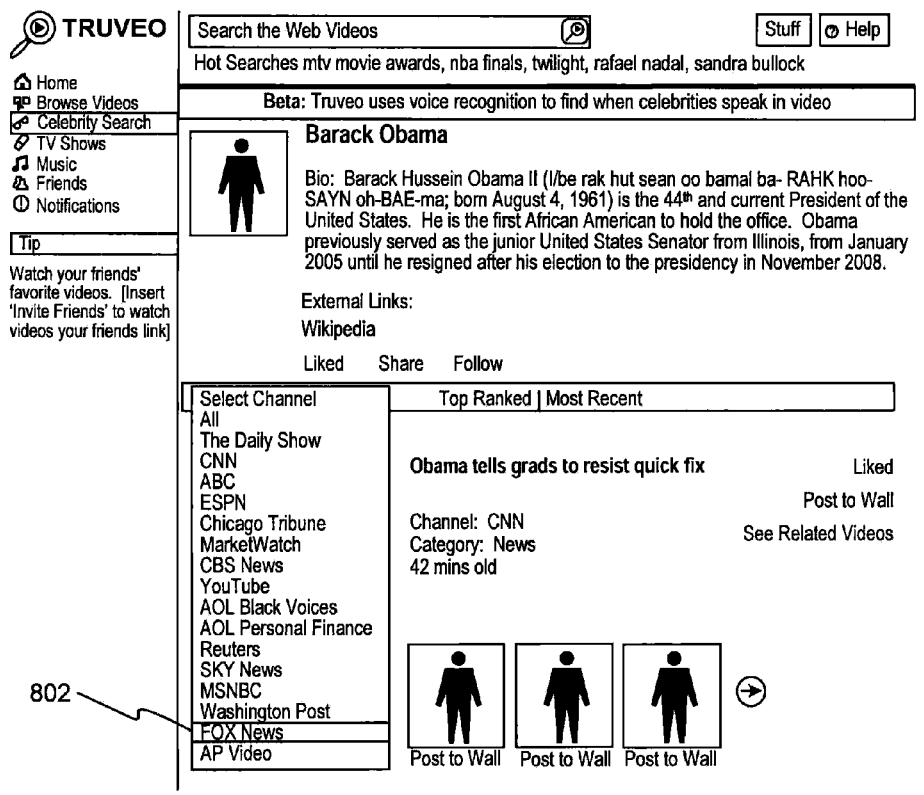
FIG. 8A is a screenshot of exemplary video search results and filtering element of a system for manipulating electronic media content over the Internet, consistent with embodiments of the present disclosure.
Figure 8B:
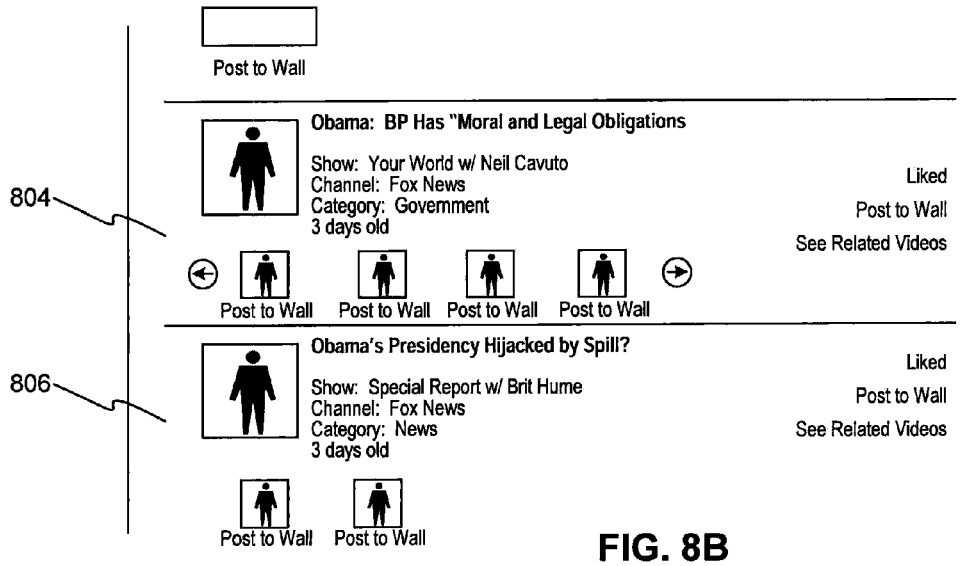
FIG. 8B is a screenshot of exemplary video search results of a system for manipulating electronic media content over the Internet, consistent with embodiments of the present disclosure.

FIG. 8A is a screenshot of exemplary video search results page and filtering element 802, by which a user may select only videos corresponding to a particular source (e.g., a particular content provider 150, such as CNN.com or FoxNews.com). FIG. 8B is a screenshot of an exemplary video search results page, showing two different primary videos 804 and 806. In one embodiment, a user may determine how long a video is, how long a speaker is speaking, or how long a speaker appears in the video, by comparing the number of component clips associated with the primary video clip. As shown in FIG. 8B, primary video clip 804 contains four component clips, while primary video clip 806 contains two component clips. In this case, a user may infer that Barack Obama speaks for a longer period of time in primary video clip 804 than in primary video clip 806.

Figure 9:
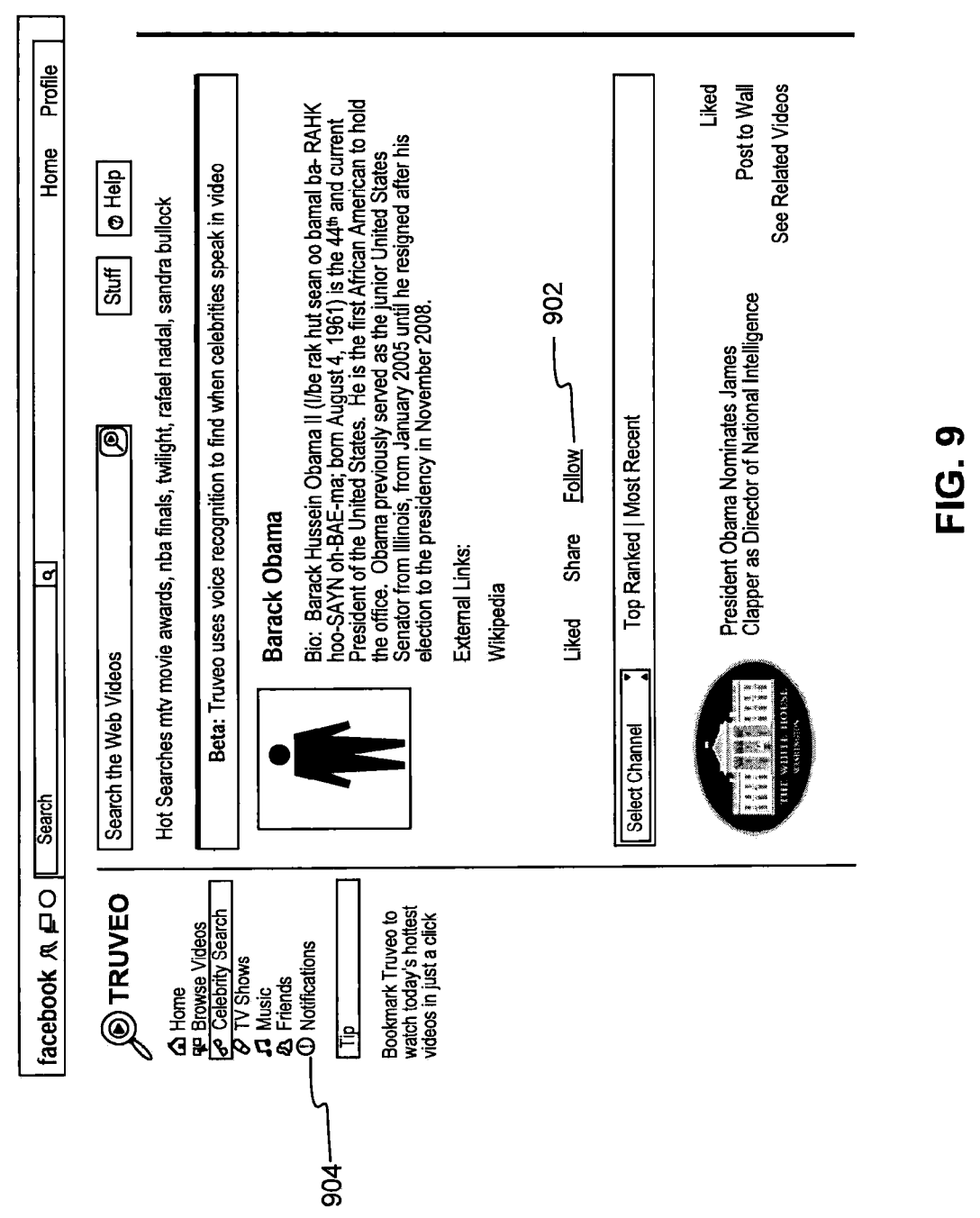

FIG. 9 is a screenshot of exemplary video search results, a speaker "following" element 902, and a notification element 904 associated with a main page of a particular speaker, in this case Barack Obama. In one embodiment, a user may click the "Follow" link 902 to subscribe to a particular speaker or celebrity. Thereafter, the user will receive notifications 904 any time the followed speaker performs certain actions on the Internet, or has video with speech uploaded to the Internet. For example, system 100 may continually or periodically analyze newly posted videos, identify any speakers associated with those videos, and then notify users who are interested in those particular speakers when such a video is available. In one embodiment, system 100 may send a link to the video to the user via e-mail or text message. Alternatively or additionally, system 100 may push an update notification to a user through a social networking website or other Internet portal.

In view of the foregoing, it will be appreciated that, in order to build not only rich but also accurate associations among videos, it becomes advantageous to look into the video stream to discover its true content. This problem may be approached by first performing audio stream analysis to discover celebrity speakers and then finding videos that contain common portions of speech from a celebrity. This information may then be used to provide relevant and interesting videos. One advantage is to provide videos in which someone is commenting on celebrities' speech. For example, when President Obama gives a new talk, the system may discover videos containing some portions of this talk, then detect whether or not someone else, especially some other celebrities, such as Jon Stewart, speaks, and select those a user will most likely be interested in as related videos. In addition, a sequence of these related videos may be generated based on their content and data may be produced to form a video pool that presents the entire development of a host event to a user.

One advantage of the present disclosure is that this technique is more scalable than other processes that examine video and audio streams for content. By way of example, building a system that recognizes any person's voice in any video on the Internet is currently computationally prohibitive. A machine would need to examine the content of M videos for N people where both M and N are very large. Embodiments of this disclosure solve aspects of the scalability problem inherit in looking within a video stream by only looking for a smaller set of individuals (e.g., celebrities) in a smaller set of premium videos. The product is effective even if we do not examine every video uploaded to a video sharing site (e.g. YouTube).

Another advantage of the present disclosure is the insight that there is often more interest in who is saying something than in what is being said. This is particularly relevant in the field of video search, where the current state of the art implementations transcribe what is spoken using speech-to-text technology. While useful, it is often the case that the key words that a user might search for are already in the description or title of the video and so speech-to-text is not helpful. For example, someone might search for "Obama healthcare". If there is a video of President Obama giving a healthcare speech, these words are often in the title or description of the video already. However, there are probably hundreds of videos where many people use the word "healthcare" and "Obama" but do not actually contain President Obama speaking. To overcome these obstacles in search one needs to identify the individual (Obama in this case), in order to deliver the appropriate result to the user. In fact, the combination of speech-to-text and speaker recognition is an advantageous solution. Our insight is that the key missing ingredient is speaker recognition.

Another advantage of the present disclosure is the development of a new search query modifier ("person:"). Web search engines and video search engines often use modifiers that allow the consumer to filter the result set. For example, "site:" is a common modifier used to filter the results ("Obama site:nytimes.com"). In video search, there are often multiple modifiers including: channel:, category:, tag:, type:, duration: etc. Embodiments of the present disclosure add a new modifier "person:" to limit the results to a particular person based on their speech, which no one has used to date.

Embodiments of the present disclosure may include a method or process, an apparatus or system, or computer software on a computer medium. It is intended that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components. Other implementations are within the scope of the following exemplary claims.

It will be apparent to those skilled in the art that various modifications and variations can be made to the systems and methods disclosed herein. It is intended that the disclosed embodiments and examples be considered as exemplary only, with a true scope of the present disclosure being indicated by the following claims and their equivalents.

What is claimed is:

1. A computer-implemented method for displaying electronic multimedia content to a user, the method comprising:
    generating, by at least one processor, a plurality of biometric models, each biometric model corresponding to one of a plurality of people;
    storing the plurality of biometric models in a database;
    receiving electronic media content over a network;
    extracting image and audio data from the electronic media content;
    detecting, by the at least one processor, biometric information in the image and audio data;
    calculating, by the at least one processor, a probability that a person in the electronic media content matches one of the plurality of people corresponding to the plurality of biometric models stored in the database, based on the biometric information and the plurality of biometric models;
    applying the probability to a ranking or filtration of the electronic media content; and
    displaying the electronic media content to users based on the ranking or filtration.

2. The computer-implemented method of claim 1, wherein the biometric models are generated based on facial recognition or speech recognition techniques.

3. The computer-implemented method of claim 1, further comprising:
    receiving an input from a user indicating interest in a selected one of the plurality of people; and
    notifying the user if electronic media content is determined to involve the selected one of the plurality of people.

4. The computer-implemented method of claim 1, wherein notifying the user is performed by emailing, text messaging, or electronic messaging the user with a link to the electronic media content.

5. A computer-implemented method for displaying electronic multimedia content to a user, the method comprising:
    generating, by at least one processor, a plurality of biometric models, each biometric model corresponding to one of a plurality of people;
    storing the plurality of biometric models in a database;
    receiving electronic media content over a network;
    extracting image or audio data from the electronic media content;
    detecting, by the at least one processor, biometric information in the image or audio data;
    calculating, by the at least one processor, a probability that a person in the electronic media content matches one of the plurality of people corresponding to the plurality of biometric models stored in the database, based on the biometric information and the plurality of biometric models;
    receiving a search query including a person-specific modifier;
    applying the probability to a ranking or filtration of electronic media content; and
    displaying electronic media content to users based on the person-specific modifier.

6. The computer-implemented method of claim 5, wherein the biometric models are generated based on facial recognition or speech recognition techniques.

7. The computer-implemented method of claim 6, further comprising:
    receiving an input from a user indicating interest in a selected one of the plurality of people; and
    notifying the user if electronic media content is determined to involve the selected one of the plurality of people.

8. The computer-implemented method of claim 6, wherein notifying the user is performed by emailing, text messaging, or electronic messaging the user with a link to the electronic media content.

9. A system for displaying electronic multimedia content to a user, the system comprising:
    a database storing instructions for displaying electronic multimedia content to a user; and
    a processor configured to execute the instructions for:
        generating a plurality of biometric models, each biometric model corresponding to one of a plurality of people;
        storing the plurality of biometric models in a database;
        receiving electronic media content over a network;
        extracting image and audio data from the electronic media content;
        detecting biometric information in the image and audio data; and
        calculating a probability that a person in the electronic media content matches one of the plurality of people corresponding to the plurality of biometric models stored in the database, based on the biometric information and the plurality of biometric models;
        applying the probability to a ranking or filtration of electronic media content; and
        displaying electronic media content to users based on the ranking or filtration.

10. The system of claim 9, wherein the biometric models are generated based on facial recognition or speech recognition techniques.

11. The system of claim 9, wherein the processor is further configured to execute the instructions for:
    receiving an input from a user indicating interest in a selected one of the plurality of people; and
    notifying the user if electronic media content is determined to involve the selected one of the plurality of people.

12. The system of claim 9, wherein notifying the user is performed by emailing, text messaging, or electronic messaging the user with a link to the electronic media content.

13. A non-transitory computer-readable medium storing instructions for execution by at least one processor to perform a method of displaying electronic multimedia content to a user, the method comprising:
    generating a plurality of biometric models, each biometric model corresponding to one of a plurality of people;
    storing the plurality of biometric models in a database;
    receiving electronic media content over a network;

extracting image or audio data from the electronic media content;
detecting biometric information in the image or audio data;
calculating a probability that a person in the electronic media content matches one of the plurality of people corresponding to the plurality of biometric models stored in the database, based on the biometric information and the plurality of biometric models;
receiving a search query including a person-specific modifier;
applying the probability to a ranking or filtration of electronic media content; and
displaying electronic media content to users based on the person-specific modifier.

14. The non-transitory computer-readable medium of claim 13, wherein the biometric models are generated based on facial recognition or speech recognition techniques.

15. The non-transitory computer-readable medium of claim 14, further comprising:
receiving an input from a user indicating interest in a selected one of the plurality of people; and
notifying the user if electronic media content is determined to involve the selected one of the plurality of people.

16. The non-transitory computer-readable medium of claim 15, wherein notifying the user is performed by emailing, text messaging, or electronic messaging the user with a link to the electronic media content.

* * * * *